(12) United States Patent
Adams, III

(10) Patent No.: US 8,062,106 B1
(45) Date of Patent: Nov. 22, 2011

(54) LIFTING HOLDER FOR AN ANIMAL FEEDER

(75) Inventor: Floyd C. Adams, III, Greensboro, NC (US)

(73) Assignee: C.E. Smith Co., Inc., Greensboro, NC (US)

( * ) Notice: Subject to any disclaimer, the term of this patent is extended or adjusted under 35 U.S.C. 154(b) by 51 days.

(21) Appl. No.: 12/729,531

(22) Filed: Mar. 23, 2010

Related U.S. Application Data

(60) Provisional application No. 61/163,246, filed on Mar. 25, 2009.

(51) Int. Cl.
  *A22B 7/00* (2006.01)
(52) U.S. Cl. ..................................... 452/189
(58) Field of Classification Search .................. 452/185, 452/187–192, 198; 212/175–177, 179, 180, 212/294; 414/462, 539–543
  See application file for complete search history.

(56) References Cited

U.S. PATENT DOCUMENTS

| | | | | |
|---|---|---|---|---|
| 4,986,220 | A | 1/1991 | Reneau et al. | 119/57.91 |
| 5,421,290 | A | 6/1995 | Welch | 119/51.11 |
| 5,794,563 | A | 8/1998 | Klepac | 119/57.91 |
| 6,622,653 | B1 | 9/2003 | Starnes, Jr. | 119/51.01 |
| 6,695,688 | B1 * | 2/2004 | Owen et al. | 452/187 |
| 7,341,507 | B1 * | 3/2008 | Julian, Sr. | 452/192 |
| 7,476,149 | B2 * | 1/2009 | Burrows | 452/187 |
| 7,913,980 | B1 * | 3/2011 | Cipriano | 254/393 |

* cited by examiner

*Primary Examiner* — Richard Price, Jr.
(74) *Attorney, Agent, or Firm* — MacCord Mason PLLC

(57) ABSTRACT

A lifting holder system for an animal feeder is shown and described. In one example, the system comprises a tree-interface bar having an upper portion and a lower portion. An extension arm is pivotally attached to the upper portion of the tree-interface bar. A linear actuator is attached to the tree-interface bar and to the extension arm. A feeder/carcass-interface is attached to the extension arm. The result is a system that allows for easy lifting and lowering of an animal feeder to great heights.

20 Claims, 6 Drawing Sheets

LIFTING HOLDER FOR AN ANIMAL FEEDER

This application claims the benefit of Provisional Application Ser. No. 61/163,246 filed Mar. 25, 2009.

FIELD OF TECHNOLOGY

The present disclosure relates generally to animal feeders, and more particularly to holders for animal feeders and, optionally, animal carcasses.

RELATED TECHNOLOGY

Animal feeders are known in the art. FIG. 1 shows one example of an animal feeder 10. In general terms, feeders 10 include a container or barrel 12 that is configured to hold feed. Typical feed includes, for example, corn or other suitable grains or mixes of grains and other supplements. Barrels 12 commonly include a funnel 22 that feeds to spout 24. Distributor 26 is rotated by motor 28 powered by battery 30. Distributors may be programmed to rotate at pre-determined times or at specific intervals. Typically, feeders are mounted on legs 14 to form tripods, or are suspended using bail 16 and ropes 18. Feeders may also have a lid 20

Feeders, such as the one represented in FIG. 1, are typically used as part of an animal management plan to support healthy populations of animals and to supplement their dietary needs. For example, they may be used as part of a management plan for wild deer or turkeys. Somewhat similarly, they may be used as part of a management plan for captive animals, e.g., animals in zoos. Additionally, feeders may be used in game-harvesting situations, e.g., a hunter may position themselves near a feeder and harvest animals approaching, feeding at, or departing from a feeder.

Applicant has discovered that traditional mounting systems are less than ideal for a variety of reasons. For example, Applicant believes tripod systems typically compromise either stability or feed distribution range, with taller tripods producing better distribution, but being more prone to topple. Additionally, Applicant has discovered that in some instances poor feed distribution can lead to large, visible feed piles (e.g., ½ inch or higher), which are more likely to attract animals having a lazy grazing strategy. Examples of such animals include bears and hogs, which seek to feed at high-concentration food deposits. In such situations, these grazers may out-compete desired species, and are more prone to knock feeders over. Additionally, Applicant has found tripod systems to be difficult to load with food as it is often difficult to lower the feeder to an accessible height, or may require a ladder to access the feeder.

Somewhat similarly, Applicant has found rope mounted feeders to also be undesirable. For example, Applicant believes that suspending heavy feeders from tree limbs creates several problems, such as finding a satisfactory tree limb in the desired location and the risk of danger to person and property should the limb or rope break. Additionally, it is also difficult to lower such feeders for loading.

In addition to the above noted feeder problems, Applicant believes that existing gambrel and animal hoist systems can suffer from any number of deficiencies. For example, even with block and tackle type hoists, some animals, e.g., bears, large deer, elk, etc., may be difficult to suspend for the user. This difficulty may be due to any combination of small diameter rope, cold hands, or inefficient hoisting systems. Even after an animal has been lifted, it may similarly be difficult to re-adjust relative height of the suspended animal, which is sometimes necessary for dressing different parts of the animal. Further, in many systems, even if an animal is lifted, Applicant found the uncontrolled rotation of the suspended animal to be undesirable. For example, when knife pressure is applied to the hide or meat of the suspended animal, the animal may rotate uncontrollably in the direction of the pressure. Applicant found this to be undesirable and dangerous.

Various embodiments of the instant invention may be directed to any of these or additional problems.

SUMMARY

To summarize, in one example, the invention includes a lifting holder system for an animal feeder. The system comprises a tree-interface bar having an upper portion and a lower portion. An extension arm having a proximal portion, an elbow, and a distal portion is pivotally attached to the upper portion of the tree-interface bar. A lift-mechanism, e.g. a linear actuator, is attached to the tree-interface bar and to the extension arm. A feeder-interface is attached to the extension arm. The result is a system that allows for easy lifting and lowering of an animal feeder to great heights. In some configurations, the system may also allow for easy lifting and lowering of animal carcasses for processing, e.g., skinning, gutting, butchering, etc.

The above summary was intended to summarize certain embodiments of the present invention. Embodiments will be set forth in the more detail in the figures and detailed description below. It will be apparent, however, that the detailed description is not intended to limit the present invention, the scope of which should be properly determined by the appended claims.

DETAILED DESCRIPTION OF EXEMPLARY EMBODIMENTS

Figure 1:
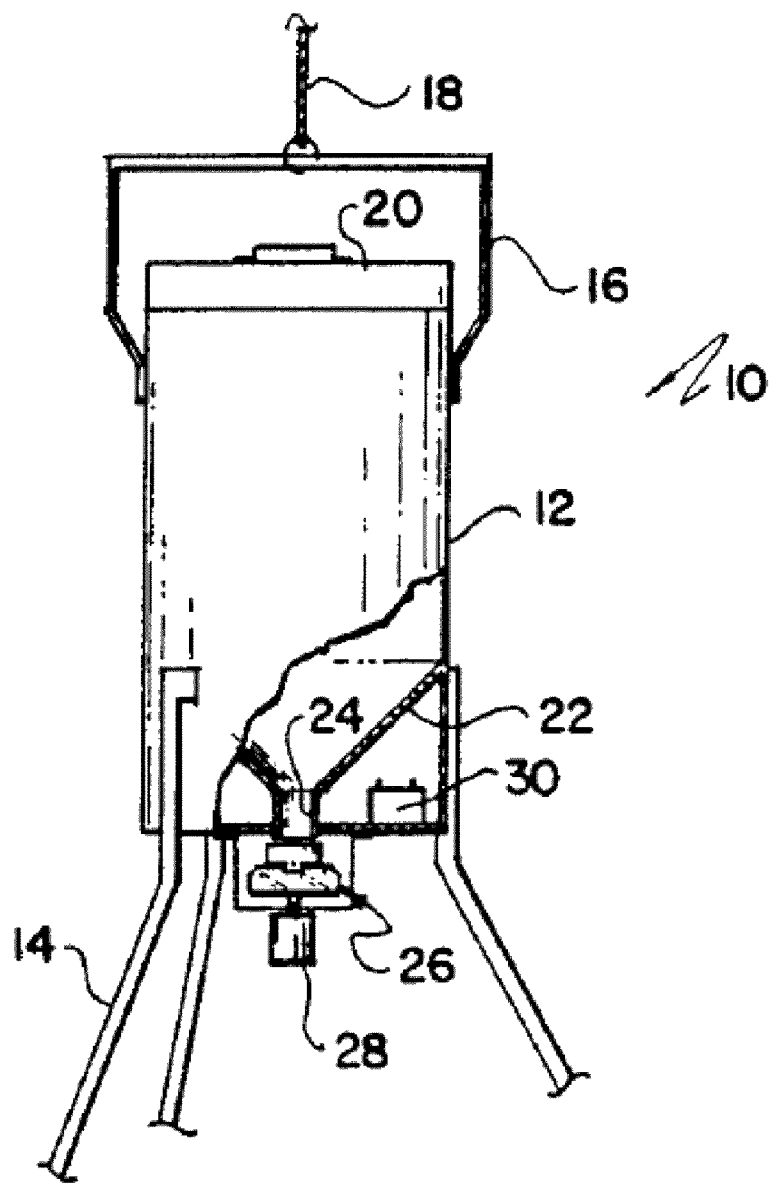
FIG. 1 shows an example of related technology.
Figure 2:
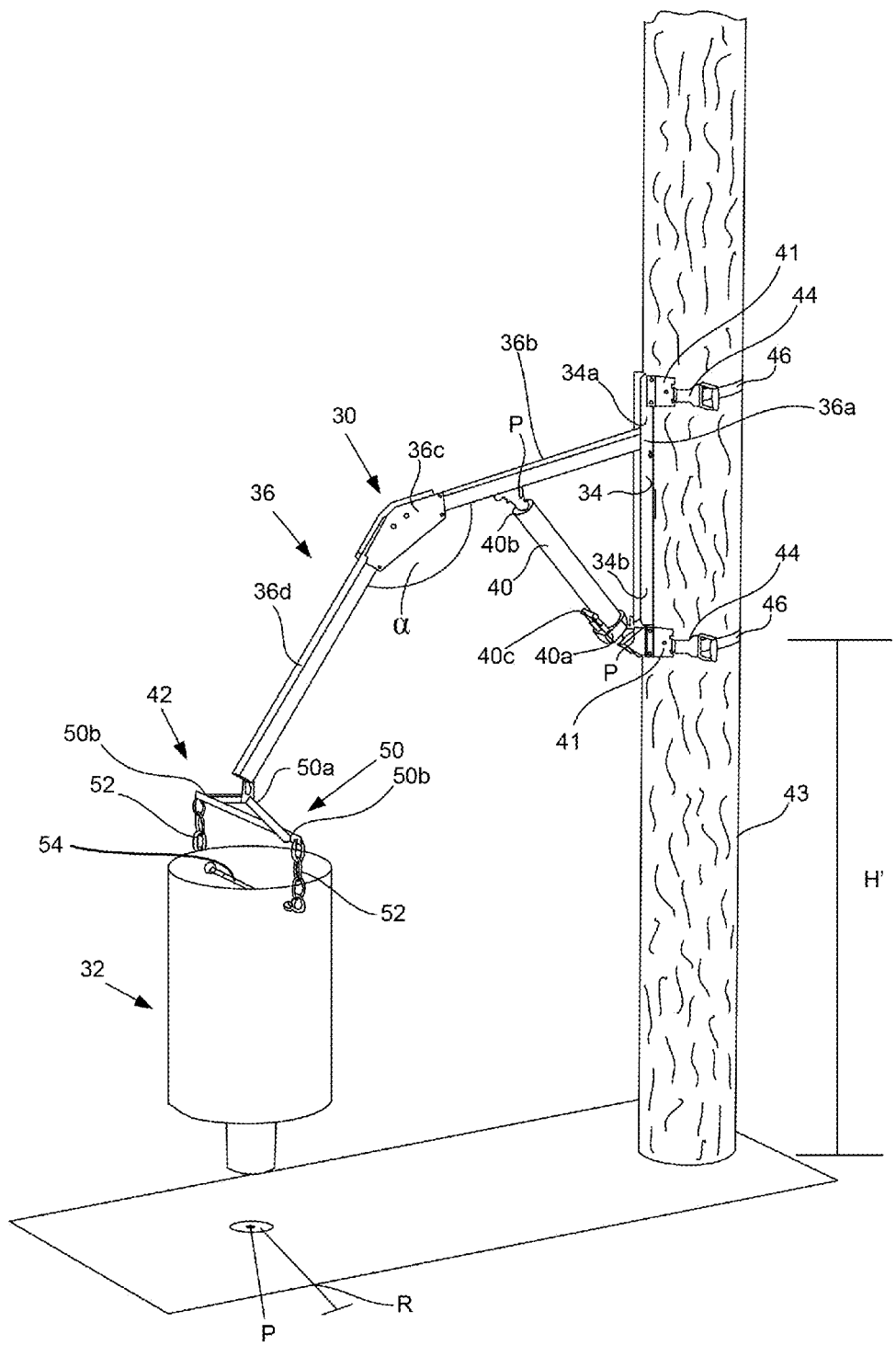
FIG. 2 shows one embodiment of a lift as disclosed herein in combination with a feeder.

FIG. 2 illustrates one example of a system of the invention interfaced with animal feeder 32, an optional component, in a lowered position. In this embodiment, system 30 includes tree-interface bar 34, extension arm 36, linear actuator 40 and feeder/carcass-interface (F/C-interface) 42. Animal feeder 32 is attached to F/C-interface 42. In the embodiment shown, the lid of feeder 32 is removed to facilitate viewing. In use, feeders may commonly include a lid (not shown) to keep contents dry.

As seen, tree-interface bar 34 includes upper portion 34a and lower portion 34b and is configured to extend along the length of tree 43. The upper portion may be considered the portion above the midpoint of the bar and the lower portion may be considered the portion below the midpoint of the bar. Extension arm 36 is pivotally attached to tree-interface bar 34 at point 36a. Extension arm 36 may include proximal portion 36b, elbow 36c, and distal portion 36d. Other exemplary embodiments may include a straight extension arm or may omit the elbow. Linear actuator 40 is configured to lift extension arm 36, and is also usually configured to control the decent of extension arm 36. The linear actuator is shown as a hydraulic cylinder, but other embodiments include other linear actuators e.g., screw jacks.

Typically, linear actuator 40 is pivotally attached at its bottom end 40a to bar 34 and pivotally attached at its top end 40b to arm 36 at points P. F/C-interface 42 is attached to distal portion 36d of extension arm 36.

In this embodiment, tree-interface bar 34 includes at least one concaved portion 41 configured to abut tree 43. Concaved portions may be rigid, for example, to inhibit rotation, shift or shear of the tree-interface bar. Other embodiments may include more concaved portions or longer concaved portions. Tree-interface bars may also include a device for secure connection to a tree. In the embodiment depicted, ratchet 44 and strap 46 are attached to bar 34 and facilitate attachment to tree 43. Strap 46 has a length sufficient to surround tree 43 and ratchet 44 is configured to tighten strap 46 to prevent most or all vertical movement of system 30 along tree 43. Typically, at least two ratchets 44 and straps 46 will be used. Ratchet devices, e.g. as described above, may be desirable for releasably securing lift systems. In other embodiments, devices for connecting may include other structures, e.g., bolts or nails, etc. Further, it should be clear that tree-interface bars of the invention are in no way limited to being only interfaced with trees. In many situations, they may be interfaced with posts or telephone poles, etc.

Although sizes and shapes may vary from embodiment to embodiment, in exemplary embodiments, the proximal portion of the extension arm will have a length (L') chosen from about 2 feet to about 6 feet and the distal portion will have a length (L") chosen from about 2 feet to about 6 feet. If elbows are used, they may form an angle α chosen from about 90° to about 160°, and more typically, about 100° to about 140°.

In this embodiment, feeder/carcass-interface (F/C-interface) 42 includes gambrel, or frame for hanging, 50. Typically, gambrel 50 includes an upper region 50a and two lower regions 50b. Upper region 50a is configured to interface with distal portion 36d of the extension arm, and lower regions 50b are configured to link to feeder 32. Interface between F/C-interfaces and extension arms will often be configured to prevent 360° rotation of the feeder or animal carcass contained thereon. Such a configuration may include a rigid attachment, or as shown, attachment by a rigid link. Gambrel 50 may also include at least one link 52 on regions 50b for attaching to feeder 32.

Figure 3:
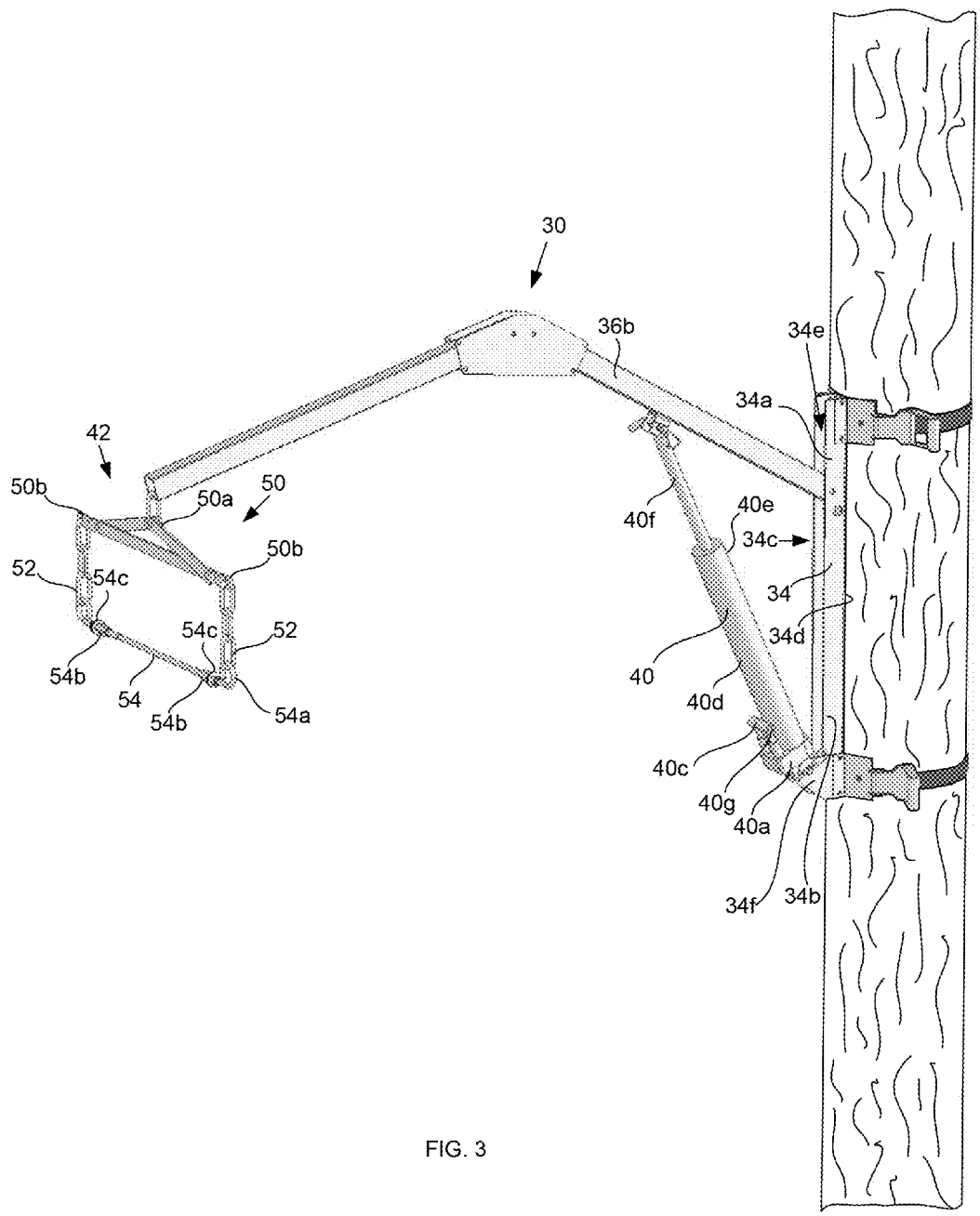
FIG. 3 shows a close-up view of the lift of FIG. 2.

In some embodiments, systems of the invention will include a bar 54 configured to extend through feeders and provide at least one point of attachment for F/C-interfaces. FIG. 3 shows another view of system 30, with feeder 32 removed to facilitate viewing of, inter alia, bar 54. In this Figure, bar 54 is clearly seen to include attachment ears 54a, which are configured to attach to links 52 of feeder-interface 42. Typically, one or both of the attachment ears will be threaded to bar 54 at points 54b such that an ear may be removed to allow bar 54 to be inserted into apertures in the feeder (not shown; which may be made by the end user), at which time the ear is reattached to secure the bar in its desired location. It may also be desirable to include stops 54c for abutting either the outside or inside surface of a feeder.

FIG. 3 is also useful for illustrating the front side 34c and back side 34d (opposite front side) of tree-interface bar 34. As seen, tree-interface bar 34 defines a channel 34e extending through the top of upper portion 34a. Channel 34e is open on front side 34c and sized to receive proximal portion 36b of the extension arm. As a result, the extension arm can be nested within channel 34e of the tree-interface bar when the linear actuator is in an extended position (similar to for example, FIG. 5). Such a configuration provides additional support against torque or rotational forces that may be applied to the lift during use, e.g., feeding or processing. Further, such a configuration allows feeders and carcasses to be lifted to greater heights.

FIG. 3 also illustrates the front side 40d and backside 40e of linear actuator 40. Drive 40c is configured to stroke the linear actuator by extending piston 40f. Drive 40c may also be used to lower piston 40f. In the embodiment shown, drive 40c is positioned on front side 40d of the linear actuator. As also seen here, drive 40c defines a channel 40g for receiving a disengageable leverage bar for operating the drive.

FIG. 3 also illustrates a seat 34f of tree-interface bar 34. In this example, seat 34f extends forward from front side 34c of the tree-interface and is positioned on the lower portion 34b. Bottom end 40a of the linear actuator is pivotally attached to seat 34f.

It may also be appreciated from this figure, that tree-interface bar 34 does not include wheels on its back side, or the side intended to make contact with the tree or post.

Figure 4:
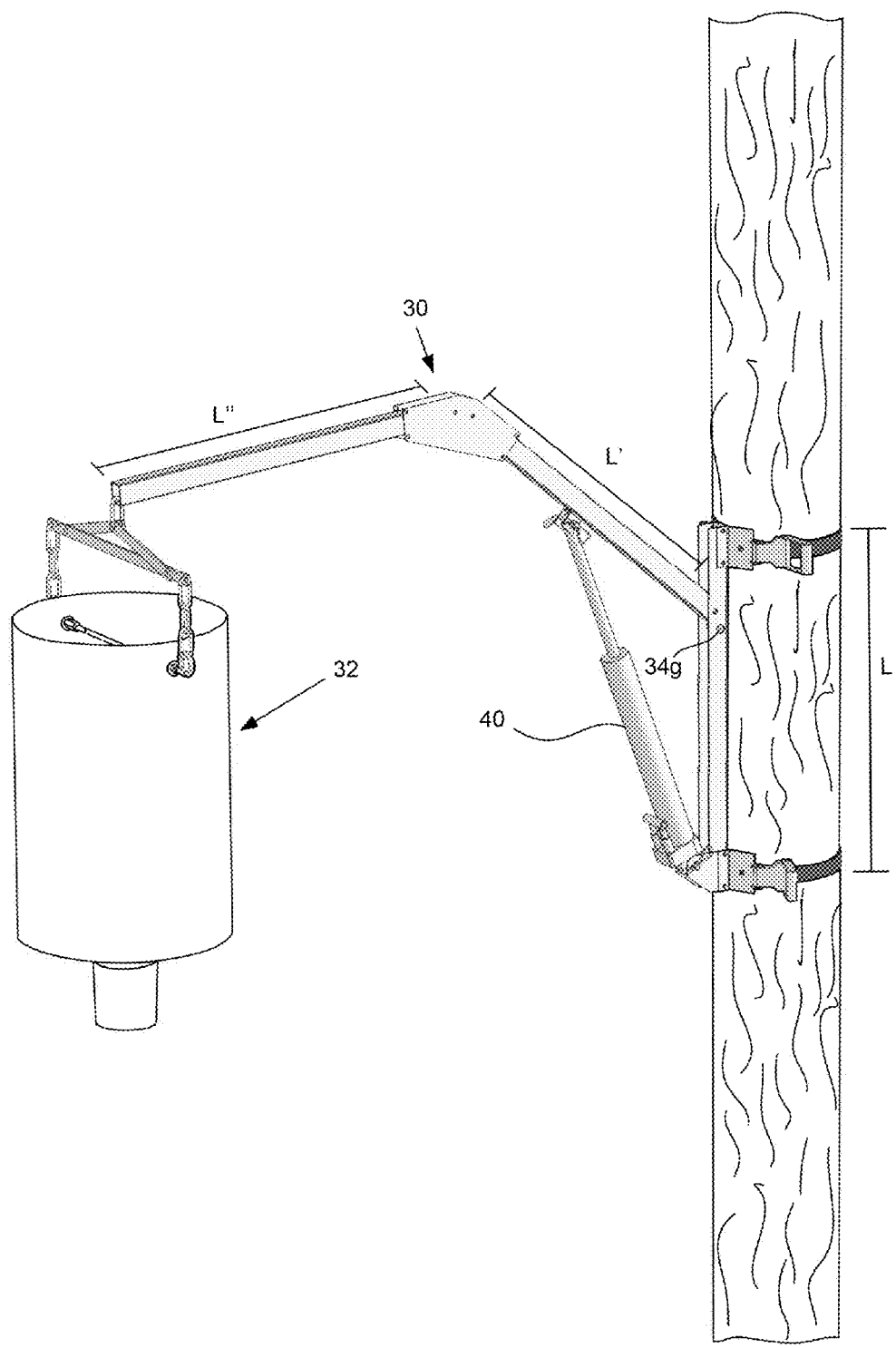
FIG. 4 shows another view of a lift in combination with a feeder.
Figure 5:
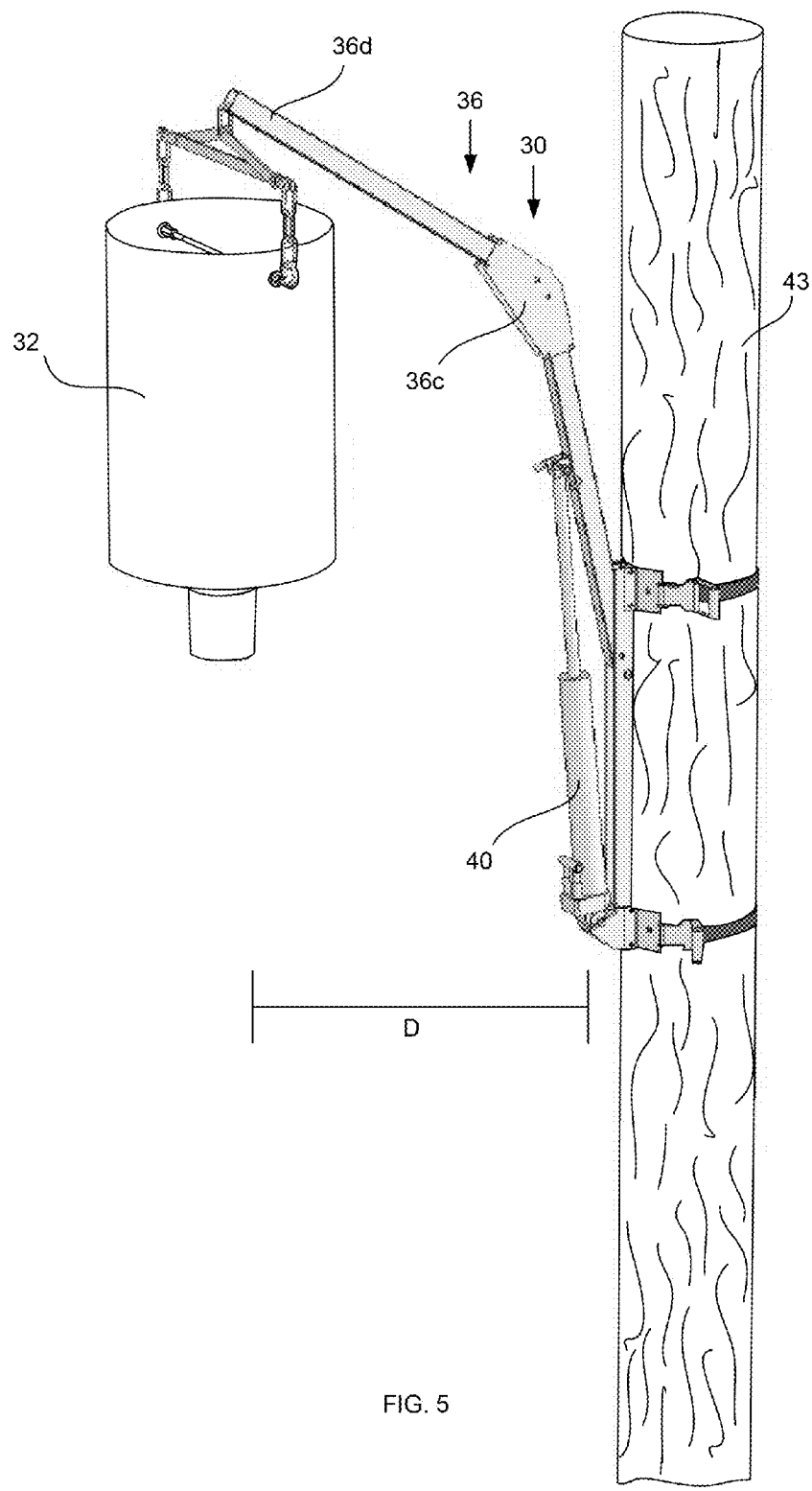
FIG. 5 shows another view of a lift in combination with a feeder in another configuration.

In terms of use, feeders may be filled with any desired feed and then lifted by actuating the linear actuator of the invention. For example, in the embodiment shown, a bar may be inserted into drive 40c and moved to stroke the linear actuator. FIG. 4, for example, shows linear actuator 40 actuated a particular amount to lift the feeder a desired height. FIG. 5 shows linear actuator 40 stroked or actuated to an even further extent, e.g., almost at full extension. As seen, elbow 36c allows feeder 32 to be positioned at a distance D away from tree 43 at full extension. Applicant has found this feature to be useful for, inter alia, distributing food in a larger radius R from a point P under the feeder (R and P shown in FIG. 2). If users desire a more concentrated feed distribution, e.g., more feed near point P, they may lower the feeder, e.g., as seen in FIG. 4. Additionally, elbow 36c may be useful for holding feeder 32 a sufficient distance from the extension arm 36 to prevent feeder 32 from bumping into extension arm 36, e.g., during periods of high winds, which could potentially scare animals or disturb their feeding patterns. Applicant believes this benefit is useful in game-harvesting situations. Applicant believes another benefit of the instant invention is realized in animal photography situations, e.g., where a motion camera is in use to photograph animals in the area or those feeding under a feeder. In such situations, because of the systems ability to raise feeders to great heights, e.g., 10 feet or more with ease, animal photographs will not include unsightly feeder support legs commonly seen when existing technologies are used. Tree-interfaces may also include a security system, e.g., port 34g (as seen in FIG. 4) for using a chain, cable, etc. to secure the lift to the system.

Figure 6:
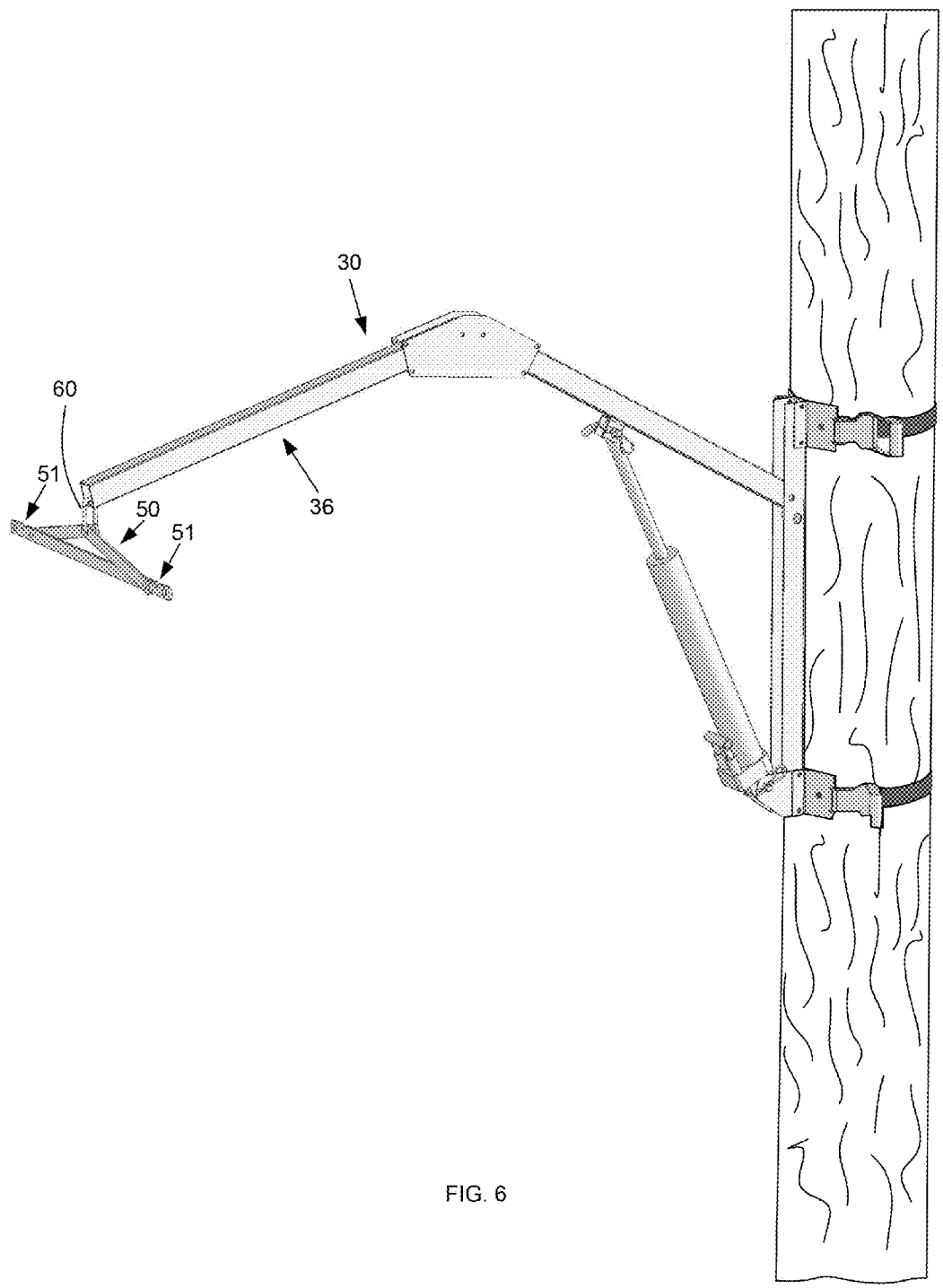
FIG. 6 shows another view of a lift in another configuration.

FIG. 6 illustrates another benefit of various embodiments of the invention, which is also configured or configurable for animal processing. In this configuration, gambrels can include any number of portions configured to engage the leg of an animal, e.g., a deer, goat, antelope, etc. In the embodiment shown, portions configured to engage the leg of an animal are notches 51, which may be placed in a slit formed between the tendon and bone of an animal's lower legs. Other embodiments include hooks or loops configured to engage a deer's legs or head. Additionally, in this configuration links, e.g., links 52 shown previously, may be removed. After the gambrel engages the animal, the animal may be easily lifted to a desired height for processing, e.g., skinning. In this configuration, it may also be desirable to include an anti-rotation feature, e.g., rigid ring 60 connecting gambrel 50 to extension arm 36 to prevent the complete rotation of gambrel 50. Applicant believes such an anti-rotation feature will be useful during processing to prevent the animal from rotating, which Applicant has found can considerably increase the amount or time, or number up people, or both, it takes to process an animal.

Embodiments of the invention may also be easily configured for packaging, transport and shipping. For example, systems may include extension arms that separate into at least one section having a length similar to the length of the tree interface. Referring to FIG. 4, for example, tree-interface bars may have a length L, the proximal portion of the extension arm, may have a length L', and the distal portion of the extension arm may have a length L". In some embodiments, L, L', and L" may be approximately the same length, e.g., a length chosen from about 2 to about 6 feet. As such, the length of the extension arm would be about 2L. In other examples, the length of the extension arm may be about 1.5L to about 3L. Further, pivot points may be easily established by a pin, e.g., a clevis pin.

Numerous characteristics and advantages have been set forth in the foregoing description, together with details of structure and function. The novel features are pointed out in the appended claims. The disclosure, however, is illustrative only, and changes may be made in detail, especially in matters of shape, size, and arrangement of parts, within the principle of the invention, to the full extent indicated by the broad general meaning of the terms in which the general claims are expressed.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10, as well as all ranges beginning and ending within the end points, e.g. 2 to 9, 3 to 8, 3 to 9, 4 to 7, and finally to each number 1, 2, 3, 4, 5, 6, 7, 8, 9 and 10 contained within the range. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

What is claimed is:

1. A lifting holder system for an animal feeder or an animal carcass, said system comprising:
    a tree-interface bar having a length L and being configured to interface with a tree in a substantially linear orientation, wherein said tree-interface bar includes
        an upper portion,
        a lower portion,
        a front side, and
        a back side;
    a strap-interface connected to said back side of said tree-interface bar and extending therefrom;
    an extension arm having a proximal portion and a distal portion,
        wherein said proximal portion is pivotally attached to said upper portion of said tree-interface bar, and
        wherein the length of said extension arm is chosen from about 1.5L to about 3L;
    a feeder/carcass-interface (F/C-interface) attached to said distal end of said extension arm;
    a linear actuator having a front side, a back side, a bottom end and a top end, wherein said bottom end is pivotally attached to said tree-interface bar and said top end is pivotally attached to said extension arm; and
    a drive configured to stroke said linear actuator; thereby providing a system configured to raise and lower said feeder or said carcass.

2. The system of claim 1, wherein said strap-interface includes a pair of rigid concaved portions, each curved to abut a tree.

3. The system of claim 2, further including a ratchet and strap positioned in between the pair of concaved portions, wherein said strap has a length sufficient to surround a tree, and wherein said ratchet is configured to tighten said strap.

4. The system of claim 1, wherein said proximal portion of said extension arm has a length L' chosen from about 2 feet to about 6 feet, and wherein said distal portion of said extension arm has a length L" chosen from about 2 feet to about 6 feet.

5. The system of claim 1, wherein said extension arm includes an elbow forming an angle α chosen from at least one of about 90° to about 160°, and about 100° to about 140°.

6. The system of claim 1, wherein said tree-interface bar includes a seat extending forward from said front side of said lower portion, and wherein said bottom end of said linear actuator is pivotally attached to said seat of said tree-interface bar.

7. The system of claim 1, wherein said tree-interface bar defines a channel extending through the upper portion of said tree-interface bar, said channel being open on said front side and sized to receive said proximal portion of said extension arm, thereby allowing said extension arm to be nested within said tree-interface bar when said linear actuator is in an extended position.

8. The system of claim 1, wherein said drive is positioned on the front side of said linear actuator.

9. The system of claim 1, wherein said drive defines a channel for receiving a disengageable leverage bar.

10. The system of claim 1, wherein said linear actuator is a hydraulic lift or a mechanical lift.

11. The system of claim 1, wherein said F/C-interface includes a gambrel having an upper region and two lower regions,
    wherein said upper region is configured to interface with said distal portion of said extension arm, and
    wherein said lower regions are configured to link to said feeder.

12. The system of claim 11, further including at least one link on each of said lower regions of said gambrel, said links configured to attach to said feeder.

13. The system of claim 11, wherein said lower regions of said gambrel each include a portion configured to engage the leg of an animal.

14. The system of claim 13, wherein said portion configured to engage the leg of an animal is notch.

15. The system of claim 1, wherein said feeder-interface further includes a separate support rod configured to extend through said feeder and create an attachment point on each side of said feeder.

16. The system of claim 1, wherein said tree-interface bar does not include wheels on its back side.

17. The system of claim 1, further including a separate bar configured to extend through a feeder, wherein said bar includes at least one attachment ear for the feeder-interface.

18. The system of claim 1, further including a feeder attached to said feeder-interface.

19. A lifting holder system for an animal feeder or an animal carcass, said system comprising:
- a tree-interface bar having a length L and being configured to interface with a tree in a substantially linear orientation, wherein said tree-interface bar includes
  - an upper portion,
  - a lower portion,
  - a front side,
  - a back side, and
  - a seat extending forward from said front side of said lower portion, and
  - wherein said tree-interface bar defines a channel extending all the way through the upper portion of said tree-interface bar, said channel being open on said front side;
- a first and second rigid strap-interface, each including a pair of concaved portions connected to said back side of said tree-interface bar and extending therefrom in a curved manner;
- a first and second ratchet and strap, one positioned in between each of said pair of concaved portions, wherein each of said straps has a length sufficient to surround a tree, and wherein each of said ratchets is configured to tighten said strap;
- an extension arm having a proximal portion, an elbow, and a distal portion,
  - wherein said proximal portion is pivotally attached to said upper portion of said tree-interface bar,
  - wherein said proximal portion has a length L' chosen from about 2 feet to about 6 feet,
  - wherein said distal portion has a length L" chosen from about 2 feet to about 6 feet,
  - wherein the length of said extension arm is chosen from about 1.5L to about 3 L, and
  - wherein said elbow forms an angle $\alpha$ chosen from at least one of about 90° to about 160° and about 100° to about 140°;
- a feeder/carcass-interface (F/C-interface) attached to said distal end of said extension arm, said F/C-interface including
  - a gambrel having an upper region and two lower regions, wherein said upper region is configured to interface with said distal portion of said extension arm, and wherein said lower regions are configured to link to said feeder,
  - at least one link on each of said lower regions, and
  - a support rod configured to extend through said feeder and create an attachment point on each side of said feeder for said at least one link on each of said lower regions;
- a linear actuator having a front side, a back side, a bottom end and a top end, wherein said bottom end is pivotally attached to said seat of said tree-interface bar and said top end is pivotally attached to said extension arm; and
- a drive positioned on the front side of said linear actuator and configured to stroke said linear actuator; thereby providing a system configured to raise and lower said feeder or said carcass.

20. The system of claim 19, further including a feeder, where said support rod of said F/C interface is threaded through said feeder, and wherein said tree-interface bar does not include wheels on its back side.

* * * * *